(12) United States Patent  
Feyereisen et al.

(10) Patent No.: US 11,574,549 B2  
(45) Date of Patent: Feb. 7, 2023

(54) COMPOSITE VERTICAL PROFILE DISPLAY SYSTEMS AND METHODS

(71) Applicant: HONEYWELL INTERNATIONAL INC., Charlotte, NC (US)

(72) Inventors: Thea Feyereisen, Hudson, WI (US); Rakshit R, Bangalore (IN); Gang He, Morristown, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 143 days.

(21) Appl. No.: 17/112,140

(22) Filed: Dec. 4, 2020

(65) Prior Publication Data

US 2022/0122466 A1 Apr. 21, 2022

(30) Foreign Application Priority Data

Oct. 19, 2020 (IN) .............................. 202011045435

(51) Int. Cl.
  *G08G 5/02* (2006.01)
  *G08G 5/00* (2006.01)
  *B64D 45/04* (2006.01)
  *G05D 1/04* (2006.01)
  *B64D 43/00* (2006.01)

(52) U.S. Cl.
  CPC ............. *G08G 5/025* (2013.01); *B64D 43/00* (2013.01); *B64D 45/04* (2013.01); *G05D 1/042* (2013.01); *G08G 5/003* (2013.01); *G08G 5/0047* (2013.01)

(58) Field of Classification Search
  CPC ...... G08G 5/025; G08G 5/003; G08G 5/0047; B64D 43/00; B64D 45/04; G05D 1/042
  See application file for complete search history.

(56) References Cited

U.S. PATENT DOCUMENTS

| 5,842,142 | A | * | 11/1998 | Murray | ................ | G08G 5/0013 340/948 |
| 5,978,715 | A | * | 11/1999 | Briffe | ..................... | G01C 23/00 701/16 |
| 8,214,136 | B2 | * | 7/2012 | Caillaud | ................ | G01C 23/00 244/175 |

(Continued)

OTHER PUBLICATIONS

ForeFlight, YouTube video clip entitled "ForeFlight Feature Focus. Glide Advisor," uploaded on Mar. 28, 2017. Retrieved from Internet: https://www.youtube.com/watch?v=Z5BQnblKqh4.

*Primary Examiner* — Dale W Hilgendorf
(74) *Attorney, Agent, or Firm* — Lorenz & Kopf, LLP

(57) ABSTRACT

Methods and systems are provided for guiding or otherwise assisting operation of an aircraft when diverting from a flight plan. One method involves determining a gliding trajectory for the aircraft based at least in part on a current altitude of the aircraft, providing a graphical representation of the gliding trajectory for the aircraft, identifying a plurality of landing locations within a range defined by the gliding trajectory from the aircraft, and for each landing location of the plurality of landing locations, providing a graphical representation of a respective landing location with respect to the gliding trajectory at a respective altitude associated with the respective landing location and at a respective distance with respect to a graphical representation of the aircraft corresponding to a respective geographic distance between a current location of the aircraft and the respective landing location.

20 Claims, 4 Drawing Sheets

(56) References Cited

U.S. PATENT DOCUMENTS

| | | | |
|---|---|---|---|
| 8,285,427 B2 * | 10/2012 | Rogers | G08G 5/0086 701/3 |
| 8,543,264 B1 | 9/2013 | Tomas | |
| 8,565,944 B1 * | 10/2013 | Gershzohn | G08G 5/0039 701/25 |
| 8,676,481 B2 * | 3/2014 | Coulmeau | G08G 5/0056 701/16 |
| 9,257,048 B1 * | 2/2016 | Offer | G08G 5/0056 |
| 9,280,904 B2 | 3/2016 | Bourret et al. | |
| 9,310,222 B1 | 4/2016 | Suiter et al. | |
| 9,520,066 B2 * | 12/2016 | Spinelli | G08G 5/0056 |
| 9,567,099 B2 * | 2/2017 | Poux | B64D 45/00 |
| 9,645,582 B2 | 5/2017 | Shue | |
| 9,646,503 B2 * | 5/2017 | Kawalkar | G08G 5/0056 |
| 10,096,253 B2 * | 10/2018 | Moravek | B64D 43/00 |
| 10,108,010 B2 | 10/2018 | Zimmerman et al. | |
| 10,134,292 B2 | 11/2018 | Kushwaha | |
| 10,217,370 B2 * | 2/2019 | King | G08G 5/025 |
| 10,304,344 B2 * | 5/2019 | Moravek | G08G 5/0091 |
| 10,577,123 B1 | 3/2020 | Kirtz et al. | |
| 2007/0010921 A1 * | 1/2007 | Ishihara | G08G 5/025 701/16 |
| 2010/0265268 A1 * | 10/2010 | Wilson | G08G 5/0021 340/977 |
| 2011/0313597 A1 * | 12/2011 | Wilson | G01C 23/00 701/3 |
| 2012/0310450 A1 * | 12/2012 | Srivastav | G09B 9/08 701/3 |
| 2014/0343765 A1 * | 11/2014 | Suiter | B64D 45/08 701/18 |
| 2015/0002316 A1 * | 1/2015 | Sridhar | B64D 43/00 340/953 |
| 2015/0348423 A1 * | 12/2015 | Chaubey | G08G 5/025 701/18 |
| 2018/0273200 A1 * | 9/2018 | De Villele | B64C 9/32 |
| 2019/0041233 A1 | 2/2019 | Duerksen | |
| 2021/0088356 A1 * | 3/2021 | Glomski | G08G 5/025 |
| 2021/0183256 A1 * | 6/2021 | Saby | G08G 5/0056 |
| 2021/0383703 A1 * | 12/2021 | Venkataramana | G05D 1/042 |

* cited by examiner

COMPOSITE VERTICAL PROFILE DISPLAY SYSTEMS AND METHODS

CROSS REFERENCE TO RELATED APPLICATION

This application claims priority to Indian Provisional Patent Application No. 202011045435, filed Oct. 19, 2020, the entire content of which is incorporated by reference herein.

TECHNICAL FIELD

The subject matter described herein relates generally to vehicle systems, and more particularly, embodiments of the subject matter relate to aircraft systems capable of presenting multiple potential destinations on a vertical profile display.

BACKGROUND

Pilots, air traffic controllers, airline personnel and the like routinely monitor meteorological data, reports, and forecasts to assess any potential impacts on the current or anticipated flight plan and the intended destination. However, in situations where the aircraft needs to deviate from the original plan, such as an emergency situation, the information needs to be reanalyzed with respect to the deviation to facilitate continued safe operation. For example, in the case of an emergency landing, a pilot would ideally select an airport within range of the aircraft where landing is least likely to be compromised or complicated by weather or other factors. This requires consideration of numerous pieces of information (e.g., fuel remaining and distance to be traveled, weather radar and/or forecast information, terrain, obstacles, NOTAMs, SIGMETs, PIREPs, and the like), which often is distributed across different displays or instruments, requiring the pilot to mentally piece together all the different information from the different sources, while in some instances, also manually flying the aircraft concurrently. Additionally, the time-sensitive nature of aircraft operation can increase the stress on the pilot, which, in turn, increases the likelihood of pilot error.

For example, during an engine out situation, it is often desirable to select a practical landing zone so that occupants and aircraft can be delivered to the ground as soon as practical. However, there are many variables to consider when selecting an appropriate landing location during the emergency situation, such as, for example, the estimated travel time en route, the distance from the current aircraft position, the altitude of the landing location, and the altitude margin upon arrival at the landing location (e.g., in the case of degraded aircraft performance from an engine malfunction), as well as the meteorological conditions and the topography in the vicinity of the landing location or while en route to the landing location. Often, a pilot must integrate and form a decision based upon multiple different displays, glide charts, and/or the like. Accordingly, it is desirable to reduce the mental workload of the pilot or other aircraft operator and reduce the time required to identify a diversion destination location while providing improved situational awareness in a complex situation.

BRIEF SUMMARY

Methods and systems are provided for assisting operation of an aircraft diverting from a flight plan, for example, in response to an engine out condition or another anomalous condition. One method involves determining a gliding trajectory for the aircraft based at least in part on a current altitude of the aircraft, providing, on a display device, a graphical representation of the gliding trajectory for the aircraft, identifying a plurality of landing locations within a range defined by the gliding trajectory from the aircraft, and for each landing location of the plurality of landing locations, providing, on the display device, a graphical representation of a respective landing location with respect to the gliding trajectory at a respective altitude associated with the respective landing location and at a respective distance with respect to a graphical representation of the aircraft corresponding to a respective geographic distance between a current location of the aircraft and the respective landing location.

In another embodiment, an apparatus for a computer-readable medium is provided. The computer-readable medium contains computer-executable instructions stored thereon that, when executed by a processing system, cause the processing system to determine a gliding trajectory for an aircraft based at least in part on a current altitude of the aircraft, provide instructions to cause a graphical representation of the gliding trajectory for the aircraft to be displayed on a display device, identify a plurality of landing locations within a range defined by the gliding trajectory from the aircraft, and for each respective landing location of the plurality of landing locations, provide instructions to cause a graphical representation of the respective landing location to be displayed on the display device with respect to the gliding trajectory at a respective altitude associated with the respective landing location and at a respective distance with respect to a graphical representation of the aircraft corresponding to a respective geographic distance between a current location of the aircraft and the respective landing location.

In another embodiment, a flight deck display for an aircraft is provided. A vertical profile display rendered on the flight deck display includes a graphical representation of the aircraft at a vertical position corresponding to a current altitude of the aircraft, a graphical representation of a gliding trajectory for the aircraft from the current altitude of the aircraft, and a plurality of graphical representations corresponding to a plurality of airports. For each airport of the plurality of airports the respective graphical representation is positioned ahead of the graphical representation of the aircraft at a respective distance with respect to the graphical representation of the aircraft corresponding to a respective geographic distance between a current location of the aircraft and the respective airport, and the respective graphical representation is vertically positioned on the vertical profile display according to a respective altitude associated with the respective airport. The plurality of graphical representations corresponding to the plurality of airports are concurrently displayed on the vertical profile display.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
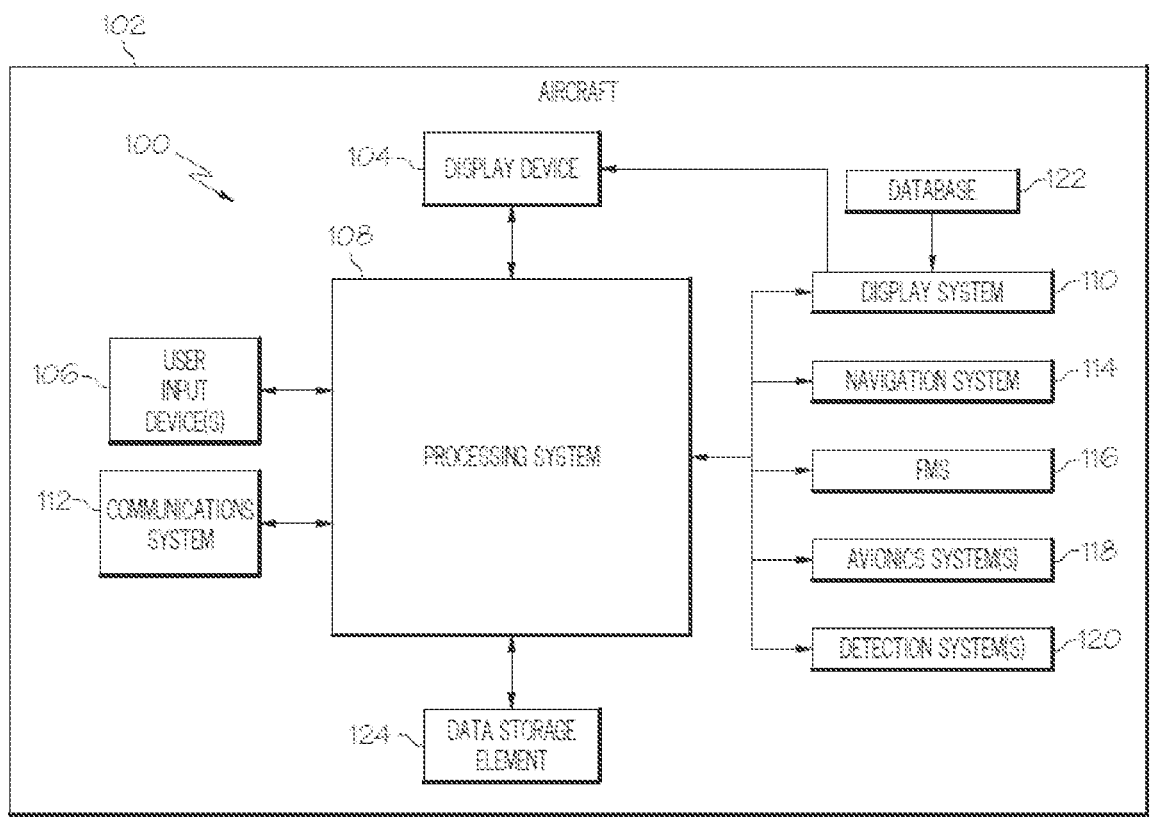
FIG. 1 is a block diagram of a system for an aircraft in an exemplary embodiment.

Embodiments of the subject matter described herein generally relate to systems and methods for assisting operation of a vehicle en route to a destination. While the subject matter described herein could be utilized in various applications or in the context of various types of vehicles (e.g., automobiles, marine vessels, trains, or the like), both manned and unmanned, exemplary embodiments are described herein in the context of an aircraft being flown en route to an airport. In particular, the subject matter may be described primarily in the context of an engine out condition when the aircraft is unable to generate or otherwise provide forward thrust.

As described in greater detail below in the context of FIGS. 2-3, when an engine out condition or a similar anomalous condition exists, a pilot, co-pilot or other crew member operating an aircraft is provided with a composite vertical profile display that includes a graphical indication of the current altitude of the aircraft along with graphical indicia of multiple, concurrently displayed potential landing locations, which are independent of a flight plan (or planned route of travel) and independent of the current heading of the aircraft. In this regard, the composite vertical profile display (or vertical situation display) provides situational awareness of the current, real-time vertical situation of the aircraft omnidirectionally with respect to multiple potential diversion destinations simultaneously. Thus, a pilot is able to quickly ascertain the vertical situation of the aircraft with respect to potential diversion destinations that are behind the aircraft or otherwise located in a direction that is offset from the current aircraft heading by any degree of offset as well as those in front of the aircraft to facilitate selection of an optimal or best diversion destination according to the pilot's selection criteria.

In exemplary embodiments, the composite vertical profile display includes a graphical representation of a gliding trajectory for the aircraft that is determined from the current altitude of the aircraft. Each airport or landing location displayed on the composite vertical profile display is depicted at the altitude associated with the respective airport, and at a lateral distance ahead of (or in front of) the graphical representation of the aircraft, independent of whether or not the airport is ahead of the aircraft or whether the aircraft is aligned with the bearing or heading required for travel from the current aircraft location to the airport, with the lateral distance corresponding to the estimated or anticipated distance (or alternatively, the estimated or anticipated travel time) for traveling between the current location of the aircraft and the location of the respective airport. In this regard, for airports that are located behind the aircraft or otherwise offset from the current aircraft heading, the lateral distance accounts for the additional distance required for the aircraft to bank, turn, or otherwise maneuver to avoid severe weather or obstacles, and to obtain a heading or bearing aligned with the respective airport or with respect to a runway at the airport. Thus, a pilot can simultaneously ascertain, for each potential landing location, the amount of lateral distance or travel time required to reach the respective landing location, along with the estimated amount of vertical height margin that exists between the aircraft gliding trajectory and the altitude of the landing location.

In exemplary embodiments, terrain is hidden or otherwise removed from the composite vertical profile display until a particular one of the displayed potential landing locations is highlighted or selected. In response to selection of a displayed landing location, the composite vertical profile display may be dynamically updated to include a graphical representation of the vertical profile of the terrain underlying an anticipated or predicted lateral trajectory or route from the current location of the aircraft to the respective landing location. Thus, a pilot may first ascertain the relative vertical situation of the potential landing locations (and their potential height margin) relative to the gliding trajectory before inspecting or otherwise analyzing the terrain, obstacles, or other factors related to traveling en route to a respective landing location. In this regard, the composite vertical profile display allows the pilot to quickly navigate through and review the en route terrain for the various potential landing locations in concert with ascertaining the vertical height margin, thereby simplifying and reducing the amount of time required for the pilot to arrive at a final diversion landing location.

FIG. 1 depicts an exemplary embodiment of a system 100 which may be located onboard a vehicle, such as an aircraft 102. The system 100 includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122, 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, and the processing system 108 and the display system 110 are cooperatively configured to display, render, or otherwise convey one or more graphical representations or images associated with operation of the aircraft 102 on the display device 104, as described in greater detail below.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map. In one or more exemplary embodiments, the display system 110 accesses a synthetic vision terrain database 122 that includes positional (e.g., latitude and longitude), altitudinal, and other attribute information (e.g., terrain type information, such as water, land area, or the like) for the terrain, obstacles, and other features to support rendering a three-dimensional conformal synthetic perspective view of the terrain proximate the aircraft 102, as described in greater detail below.

As described in greater detail below, in one or more exemplary embodiments, the processing system 108 includes or otherwise accesses a data storage element 124 (or database), which maintains information regarding airports and/or other potential landing locations (or destinations) for the aircraft 102. In this regard, the data storage element 124 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in some embodiments, the data storage element 124 also maintains status information for the runways and/or taxi paths at the airport indicating whether or not a particular runway and/or taxi path is currently operational along with directional information for the taxi paths (or portions thereof). The data storage element 124 may also be utilized to store or maintain other information pertaining to the airline or aircraft operator (e.g., airline or operator preferences, etc.) along with information pertaining to the pilot and/or co-pilot of the aircraft (e.g., pilot preferences, experience level, licensure or other qualifications, etc.).

Still referring to FIG. 1, in one or more exemplary embodiments, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference). Additionally, in one or more exemplary embodiments, the navigation system 114 includes inertial reference sensors capable of obtaining or otherwise determining the attitude or orientation (e.g., the pitch, roll, and yaw, heading) of the aircraft 102 relative to earth.

In one or more exemplary embodiments, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historical meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Figure 2:
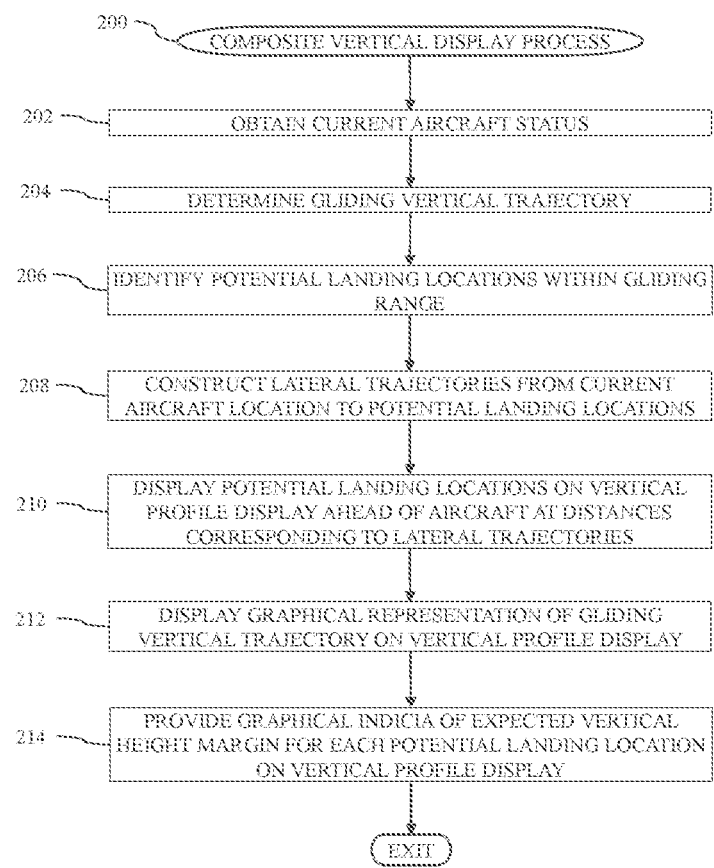
FIG. 2 is a flow diagram of an exemplary composite vertical display process suitable for use with the aircraft in the system of FIG. 1 in accordance with one or more embodiments.

Referring now to FIG. 2, in one or more exemplary embodiments, the aircraft system 100 is configured to support a composite vertical display process 200 to display, present, or otherwise provide graphical indicia of the relationship between the expected or predicted aircraft altitude and multiple different potential landing locations concurrently and perform additional tasks, functions, and operations described below. In one or more embodiments, the composite vertical display process 200 may be automatically initiated in response to the processing system 108 and/or the FMS 116 detecting an engine out condition or another anomalous condition to facilitate a pilot or other aircraft operator selecting a potential landing location for diverting operation of the aircraft 102 from a previously planned route of travel. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the composite vertical display process 200 may be performed by different elements of the system 100, such as, the processing system 108, the display system 110, the communications system 112, the navigation system 114, the FMS 116, the onboard avionics systems 118 and/or the onboard detection systems 120. It should be appreciated that the composite vertical display process 200 may include any number of additional or alternative tasks, the tasks need not be performed in the illustrated order and/or the tasks may be performed concurrently, and/or the composite vertical display process 200 may be incorporated into a more comprehensive procedure or process having additional functionality not described in detail herein. Moreover, one or more of the tasks shown and described in the context of FIG. 2 could be omitted from a practical embodiment of the composite vertical display process 200 as long as the intended overall functionality remains intact.

Still referring to FIG. 2, and with continued reference to FIG. 1, in an exemplary embodiment, the illustrated composite vertical display process 200 begins by receiving or otherwise obtaining current status information pertaining to the aircraft (task 202). The current status information pertaining to the aircraft 102 generally represents the instantaneous, real-time or most recent available values for one or more parameters that quantify the current operation of the aircraft 102. For example, the processing system 108 may obtain (e.g., from FMS 116, navigation system 114 and/or other avionic systems 118) one or more of the following: the current location of the aircraft 102, the current altitude (or above ground level) of the aircraft 102, the current heading (or bearing) of the aircraft 102, the current amount of fuel remaining onboard the aircraft 102, the current engine status, the current aircraft configuration (e.g., the current flap configuration, the current landing gear configuration, and/or the like). Additionally, the processing system 108 may obtain, either from the onboard detection systems 120 or an external system via communications system 112, current meteorological conditions at or near the current location of the aircraft 102 (e.g., the current temperature, wind speed, wind direction, atmospheric pressure, turbulence, and the like).

Based at least in part on the current aircraft status, the composite vertical display process 200 calculates or otherwise determines a gliding vertical trajectory for the aircraft using gliding characteristics associated with the aircraft (task 204). In this regard, the processing system 108 and/or the FMS 116 calculates or otherwise determines the gliding vertical trajectory that represents the expected behavior or performance of the aircraft 102 vertically while gliding along a given lateral trajectory. The gliding vertical trajectory starts at the current altitude of the aircraft 102 at the current location of the aircraft and descends along the predicted lateral trajectory at descent rates that reflects the gliding characteristics of the aircraft 102, such as, for example, the optimal glide speed for the aircraft 102 that minimizes the sink rate, the current sink rate (or lift-to-drag ratio) for the aircraft, the current weight of the aircraft 102, the current configuration of the aircraft 102, and/or the like, current wind conditions and in certain cases icing-induced glide decent rate changes. In exemplary embodiments, the processing system 108 and/or the FMS 116 identifies or otherwise determines the current sink rate (or lift-to-drag ratio) and projects the gliding vertical trajectory forward from the current aircraft altitude and location by initially using the current sink rate and current speed of the aircraft 102 and constructing a descent path that reflects the current and/or anticipated airspeed, sink rate, winds, and/or the like while en route along the predicted lateral trajectory assuming the current aircraft configuration state is maintained. In various embodiments, the composite vertical display process 200 also identifies or otherwise obtains forecasted or real-time meteorological information the current location of the aircraft (e.g., via an onboard detection system 120) or other navigational reference points or geographic areas relevant to the lateral trajectory (e.g., via communications system 112) so that the resulting gliding vertical trajectory accounts for meteorological impacts on the descent of the aircraft 102 (e.g., wind speed and direction, etc.). For example, a tailwind or headwind along the anticipated flight path can increase or decrease the airspeed above or below the optimal gliding speed and thereby increase the sink rate and reduce the predicted altitude.

In exemplary embodiments, the composite vertical display process 200 calculates or otherwise determines the gliding vertical trajectory in multiple different directions or omnidirectionally outward from the current aircraft location in order to ascertain the gliding range of the aircraft 102 for any direction in which the pilot may subsequently choose to fly the aircraft 102. In this regard, the processing system 108 and/or FMS 116 may identify or otherwise determine different potential lateral trajectories from the current location of the aircraft omnidirectionally about the aircraft 102 based on characteristics of the aircraft 102 (e.g., current aircraft configuration, current airspeed, aircraft turning radius, and/or the like), and then calculate or otherwise determine the gliding vertical trajectory with respect to each potential lateral trajectory. The lateral trajectories may account for the turning radius of the aircraft 102 to provide feasible lateral trajectories that the aircraft 102 is capable of flying given the aircraft's current airspeed, the current aircraft configuration, and potentially other factors such as meteorological conditions (e.g., altering the gliding range to avoid thunderstorms, turbulence, or the like) or the like. For each potential lateral trajectory, a corresponding gliding vertical trajectory may be determined along the lateral trajectory until reaching an altitude corresponding to the elevation of the terrain or another obstacle along that lateral trajectory. In this manner, the processing system 108 and/or FMS 116 may determine a gliding range for the aircraft 102 that is centered about the current aircraft location. As described in greater detail below in the context of FIG. 3, in one or more exemplary embodiments, a graphical representation of the gliding range is displayed on a navigational map in connection with the composite vertical display process 200.

Still referring to FIG. 2, the composite vertical display process 200 identifies or otherwise determines potential landing locations suitable for use as a diversion destination for the aircraft that are within the gliding range of the current aircraft location (task 206). In this regard, the processing system 108 and/or the FMS 116 may utilize the current aircraft location and the aircraft's gliding range to search or otherwise query an airport database (e.g., database 122) to identify potentially reachable airports that are within the gliding range about the current aircraft location. In some embodiments, the processing system 108 and/or the FMS 116 may further filter or otherwise reduce the number of potentially reachable airports for display, for example, by scoring, ranking, or otherwise prioritizing the potentially reachable airports to identify a reduced subset of airports within the gliding range that represent the best or optimal diversion destinations based on one or more optimization or selection criteria (e.g., meteorological conditions at the destination, runway length, availability of emergency equipment at the destination, location of repair station at the destination, etc.). For example, in one or more exemplary embodiments, the composite vertical display process 200 identifies the three highest-ranked airports within the gliding range for presentation on the composite vertical profile display. In this regard, it should be appreciated that the subject matter described herein is not intended to be limited to any particular scheme or criteria for ranking, selecting and/or filtering potential diversion destinations or the number of potential airports selected for presentation. Some examples of ranking and prioritizing potential diversion destinations within a given geographic are described in U.S. Pat. No. 10,096,253.

After identifying the potential landing locations within gliding range of the current aircraft location for presentation on the composite vertical profile display, for each potential landing location to be displayed, the composite vertical display process 200 constructs, generates, or otherwise determines a predicted lateral trajectory for gliding from the current aircraft location of the aircraft to a location associated with the respective landing location (task 208). In this regard, for each airport within the aircraft's gliding range selected for presentation on the composite vertical profile display, the processing system 108 and/or FMS 116 identifies a lateral trajectory that includes one or more segments between the current geographic location of the aircraft 102 and a geographic location associated with a respective airport (e.g., a geographic location of a final approach reference point) that accounts for the turning radius of the aircraft 102 and provides a feasible lateral trajectory that the aircraft 102 is capable of flying en route to the respective airport given the aircraft's current airspeed, the current aircraft configuration, and potentially other factors (e.g., meteorological conditions or the like). The lateral trajectory is utilized to estimate or otherwise determine the estimated horizontal or lateral geographic distance to be traveled from the current aircraft location to reach the respective airport, or alternatively, the estimated amount of travel time required to reach the respective airport.

After determining the lateral trajectories between the current aircraft location and the potential landing locations for display, the composite vertical display process 200 displays or otherwise renders graphical indicia of the potential landing locations at respective distances ahead of (or in advance of) the current aircraft location on the vertical profile display that correspond to the respective geographic distances for traveling from the current aircraft location to the respective landing location (task 210). In this regard, as described in greater detail below in the context of FIG. 3, any potential landing locations that are behind the aircraft or otherwise offset from the current aircraft heading are displayed in a manner that indicates the expected or estimated geographic distance required to travel from the current aircraft location to the respective landing location that accounts for the turning radius or the aircraft 102 and maneuvering required to align the aircraft heading with the respective landing location. A potential landing location may be understood as being behind the aircraft when a relative difference between a bearing or heading for traveling directly from the current aircraft location to the particular landing location and the current heading of the aircraft is greater than 90° and requires the aircraft execute a turn to arrive at the path for intercepting the airport. Thus, potential landing locations that are not substantially aligned with the current aircraft heading or otherwise in the direction of travel may still be depicted as being in front of the aircraft on the composite vertical profile display, even though reaching those potential landing locations from the current aircraft state requires turning or otherwise maneuvering the aircraft to a different heading.

Still referring to FIG. 2, the composite vertical display process 200 also displays or otherwise renders a graphical representation of the gliding vertical trajectory on the vertical profile display along with graphical indicia of the estimated vertical height margin associated with each of the displayed potential landing locations with respect to the graphical representation of the gliding vertical trajectory (tasks 212, 214). In some embodiments, the vertical trajectory to a respective landing location may be displayed in detail when the individual landing location is selected to reflect the gliding performance as it may be modulated by factors such as turns, wind conditions, and icing conditions, etc. en route to that selected landing location. As described in greater detail below in the context of FIGS. 3-4, the graphical representation of the gliding vertical trajectory emanates forward from the current aircraft altitude at the current aircraft location and descends until reaching the ground. In exemplary embodiments, the graphical indicia of the estimated vertical height margin extends vertically downward from the gliding vertical trajectory at a lateral or horizontal location corresponding to a respective airport towards the symbology representing the respective airport on the vertical profile display. Thus, the vertical dimension of the estimated vertical height margin indicia conveys the relative altitude difference between the altitude of the respective airport and the estimated aircraft altitude likely to result from gliding along the lateral trajectory en route to the respective airport.

Figure 3:
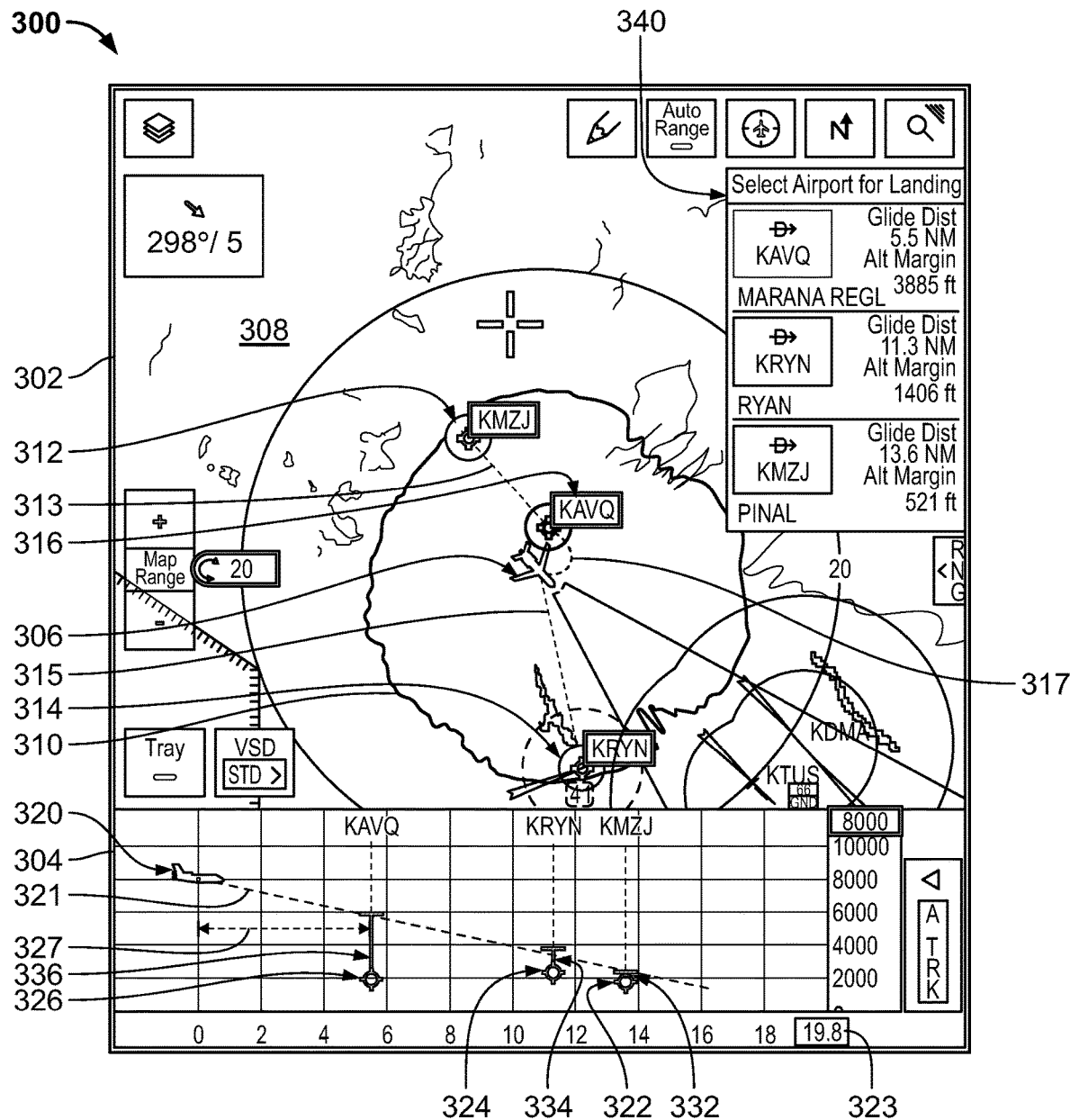
FIGS. 3-4 depict an exemplary sequence of diversion airport selection graphical user interface (GUI) displays suitable for presentation on a display device onboard the aircraft in the system of FIG. 1 in connection with the composite vertical display process of FIG. 2 in accordance with one or more embodiments.

FIG. 3 depicts an exemplary diversion airport selection graphical user interface (GUI) display 300 that may be displayed, rendered, or otherwise presented by the processing system 108 and/or display system 110 as a flight deck display on a display device 104 onboard an aircraft 102 in conjunction with the composite vertical display process 200 of FIG. 2. The graphical user interface display includes a navigational map display 302 and a vertical profile display 304 adjacent to the navigational map display 302. FIG. 3 depicts a state of the GUI display on the display device 104 after the composite vertical display process 200 has been initiated to display a composite vertical profile display to facilitate selection of a potential diversion destination for the aircraft. In this regard, prior to initiation of the composite vertical display process 200 of FIG. 2, a navigational map may include a graphical representation of a portion of route defined by a flight plan while the vertical profile display includes a graphical representation of the vertical profile of the portion of the flight plan route depicted on the navigational map that is ahead of the aircraft or is otherwise yet to be flown by the aircraft. For example, a graphical representation of the aircraft may be disposed at or near a left edge of the vertical profile display at a vertical position that corresponds to the current altitude of the aircraft, with the vertical profile of the route extending from the aircraft symbology along the left edge of the vertical profile display towards the right of the vertical profile display to depict the planned altitude for the aircraft at future navigational reference points or geographic locations along the flight plan with respect to the current aircraft position. Additionally, some embodiments of the vertical profile display may include a graphical representation of the terrain underlying the upcoming portion of the flight plan route.

The navigational map 302 includes a graphical representation 306 of the aircraft 102 overlaid or rendered on top of a background 308. The background 308 comprises a graphical representation of the terrain, topology, navigational reference points, airspace designations and/or restrictions, or other suitable items or points of interest corresponding to the currently displayed area of the navigational map 302, which may be maintained in a terrain database, a navigational database, a geopolitical database, or another suitable database. For example, the display system 110 may render a graphical representation of navigational aids (e.g., VORs, VORTACs, DMEs, and the like) and airports within the currently displayed geographic area of the navigational map 302 overlying the background 308. Some embodiments of navigational map 302 may also include graphical representations of airspace designations and/or airspace restrictions, cities, towns, roads, railroads, and other geo-political information. Although FIG. 3 depicts a top view (e.g., from above the aircraft 306) of the navigational map 302 (alternatively referred to as a lateral map or lateral view), in practice, alternative embodiments may utilize various perspective views, such as side views, three-dimensional views (e.g., a three-dimensional synthetic vision display), angular or skewed views, and the like.

In one or more exemplary embodiments, the navigational map 302 is associated with the movement of the aircraft 102, and the aircraft symbology 306 and/or background 308 refreshes or otherwise updates as the aircraft 102 travels, such that the graphical representation of the aircraft 306 is positioned over the terrain background 308 in a manner that accurately reflects the current (e.g., instantaneous or substantially real-time) real-world positioning of the aircraft 102 relative to the earth. In some embodiments, the aircraft symbology 306 is shown as traveling across the navigational map 302 (e.g., by updating the location of the aircraft symbology 306 with respect to the background 308), while in other embodiments, the aircraft symbology 306 may be located at a fixed position on the navigational map 302 (e.g., by updating the background 308 with respect to the aircraft symbology 306 such that the map 302 is maintained centered on and/or aligned with the aircraft symbology 306). Additionally, depending on the embodiment, the navigational map 302 may be oriented in a cardinal direction (e.g., oriented north-up so that moving upward on the map 302 corresponds to traveling northward), or alternatively, the orientation of the navigational map 302 may be track-up or heading-up (i.e., aligned such that the aircraft symbology 306 is always traveling in an upward direction and the background 308 adjusted accordingly).

Referring to FIG. 3 with continued reference to FIGS. 1-2, in response to initiation of the composite vertical display process 200 or another diversion airport selection process, the processing system 108 updates the navigational map 302 to include a graphical representation of the estimated or expected gliding range 310 for the aircraft 102 disposed about the aircraft symbology 306 to convey the potential range of various gliding trajectories emanating omnidirectionally from the current aircraft location (e.g., task 204). Additionally, the processing system 108 updates the navigational map 302 to include graphical representations of the potential diversion airports 312, 314, 316 identified within the estimated gliding range 310 of the aircraft 102 (e.g., task 206). For example, the highest-ranked or best three airports 312, 314, 316 within the gliding range 310 that are selected for presentation on the vertical profile display 304 may be depicted on the navigational map 302. As described above, for each potential diversion airport 312, 314, 316 identified for presentation, the composite vertical display process 200 may determine a corresponding lateral trajectory 313, 315, 317 for reaching the respective airport 312, 314, 316 from the current aircraft location (e.g., task 208), and the expected lateral trajectories 313, 315, 317 for reaching the potential diversion airports 312, 314, 316 may also be displayed or otherwise rendered on the navigational map 302 between the aircraft symbology 306 and the respective airport 312, 314, 316.

Still referring to FIG. 3, the illustrated vertical profile display 304 includes a graphical representation 320 of the aircraft 102 that is disposed at or near a left edge of the vertical profile display 304 at a vertical position that corresponds to the current altitude of the aircraft 102. In exemplary embodiments, the composite vertical display process 200 automatically removes any previously-displayed graphical representations of the upcoming flight plan or graphical representations of the terrain underlying the upcoming flight plan in response to initiation of the composite vertical display process 200. In this regard, in lieu of the previously-depicted vertical situation associated with the flight plan, the composite vertical display process 200 updates the vertical profile display 304 to include a graphical representation of a reference gliding vertical trajectory 321 displayed on the vertical profile display 304 that emanates and extends from the aircraft symbology 320 towards the right of the vertical profile display and descends downwards at a rate corresponding to the minimum sink rate for the aircraft 102 as described above. The composite vertical profile display 304 also includes a graphical representation of the lateral distance 323 that the aircraft 102 is estimated to be able to travel in accordance with the gliding vertical trajectory 321. Additionally, the composite vertical display process 200 displays or otherwise renders graphical indicia 322, 324, 326 of the potential diversion airports 312, 314, 316 identified within the aircraft's gliding range 310. As described above (e.g., task 210), the horizontal on-screen distance between the aircraft symbology 320 and a respective symbology 322, 324, 326 for a given airport corresponds to the geographic distance for the respective lateral trajectory 313, 315, 317 constructed for traveling en route to that airport (e.g., task 208). For example, for the KAVQ airport that is behind the aircraft 306 (e.g., the difference between the bearing aligned with the KAVQ airport and the current aircraft heading is greater than 90°), the horizontal distance 327 between the aircraft symbology 320 and the KAVQ symbology 326 on the composite vertical profile display 304 corresponds to the geographic distance associated with the lateral trajectory 317 that the aircraft 102 would likely fly from the current aircraft location in order to reach the geographic location associated with the KAVQ airport (e.g., 5.5 nautical miles). Likewise, the horizontal distance between the aircraft symbology 320 and the KMZJ symbology 322 on the composite vertical profile display 304 corresponds to the geographic distance associated with the lateral trajectory 313 for reaching the KMZJ airport from the current aircraft location (e.g., 13.6 nautical miles), and the horizontal distance between the aircraft symbology 320 and the KRYN symbology 324 on the composite vertical profile display 304 corresponds to the geographic distance associated with the lateral trajectory 315 for reaching the KRYN airport from the current aircraft location (e.g., 11.3 nautical miles).

As described above, the airport symbology 322, 324, 326 is rendered on the composite vertical profile display 304 at vertical position corresponding to the altitude associated with the respective airport. Additionally, in exemplary embodiments, the composite vertical profile display 304 includes graphical indicia 332, 334, 336 indicative of the estimated vertical height margin associated with each of the potential airports depicted on the composite vertical profile display 304. For example, as illustrated, the vertical height margin may be indicated using a T-shaped symbology that is horizontally positioned at a horizontal distance corresponding to the respective airport and extends downward until reaching the respective airport symbology 322, 324, 326 at the respective horizontal location. The T-shaped symbology is vertically positioned such that the intersection point of the T-shape is vertically positioned at the estimated or predicted aircraft altitude expected to result from gliding along the lateral trajectory en route to the respective airport. In this regard, meteorological conditions (e.g., headwinds, tailwinds, crosswinds) and maneuvers en route to the respective airport may result in a predicted altitude that is above or below the reference gliding vertical trajectory 321. Thus, a pilot may utilize the vertical dimension of the estimated height margin symbology 332, 334, 336 to ascertain which potential airport provides the most height margin, or alternatively, is the closest to the estimated gliding trajectory 321, thereby allowing the pilot to consider what potential actions may be required to adjust the descent rate and manage energy or otherwise land safely at a particular airport (e.g., increasing or decreasing speed relative to the optimal glide speed, altering the lateral trajectory, fuel jettison, and/or the like). The glide distance and altitude margin on vertical profile display provides a clear indication of actual travel distance and estimate altitude for the possible landing locations in any direction. For example, a navigational map display can provide a misleading impression in scenarios where an airport with closest direct distance at a location behind aircraft actually requires a longer glide distance due to turning maneuverers resulting in less altitude margin upon arrival. Thus, displaying the glide distance and altitude margin on the vertical profile display will help a pilot to decide upon a diversion landing location quicker in emergency situations. In this regard, the composite vertical profile display combines multiple considerations including glide distance from ownship, altitude margin and airport elevation on one display for multiple potential landing locations or airports, that are not required to be aligned with the aircraft's heading, track or flight plan.

Still referring to FIG. 3, in exemplary embodiments, the diversion airport selection GUI display 300 also includes a diversion airport list 340 displayed on or overlying the navigational map 302. The diversion airport list 340 may be realized as a window or similar graphical user interface that includes selectable GUI elements and additional information corresponding to the potential diversion destination airports that are displayed on the navigational map 302 and the composite vertical profile display 304. For example, the diversion airport list 340 may include a button or similar selectable item corresponding to the KAVQ airport that is accompanied by a graphical representation of the estimated geographic distance associated with the expected lateral trajectory 317 to the KAVQ airport (e.g., 5.5 nautical miles) along with a graphical representation of the estimated vertical height margin associated with the KAVQ airport (e.g., 3885 feet). In this regard, the estimated geographic distance to the KAVQ airport displayed in the list 340 corresponds to the distance 327 to the KAVQ airport symbology 326 depicted on the composite vertical profile display 304, and the estimated vertical height margin displayed in the list 340 corresponds to the vertical dimension of the vertical height margin indicia 336 between the gliding trajectory 321 and the altitude associated with the KAVQ airport. Thus, a pilot may utilize the diversion airport list 340 in concert with the composite vertical profile display 304 and the navigational map 302 to more expeditiously analyze and select a desired airport for diversion in the event of an engine out condition or another anomalous condition.

In exemplary embodiments, a pilot or other user of the diversion airport selection GUI display 300 may manipulate or otherwise select the graphical representation of a potential diversion airport using the navigational map 302 (e.g., by selecting one of the airport symbols 312, 314, 316 on the map 302), the composite vertical profile display 304 (e.g., by selecting one of the airport symbols 322, 324, 326), or the diversion airport list 340 (e.g., by selecting the selectable GUI element associated with one of the airports from within the list 340). For example, in some embodiments, a potential diversion airport may be selected by hovering a cursor over the airport symbology 322, 324, 326 on the composite vertical profile display 304. When a potential diversion airport is selected for analysis, the symbology associated with the selected airport within the vertical profile display 304 is emphasized relative to the other displayed airports, while the symbology and trajectory associated with the selected airport is concurrently emphasized within the navigational map 302. For example, in response to selection of the KAVQ airport, the KAVQ airport symbology 326 and estimated vertical height margin indicator 336 may be displayed or otherwise rendered on the vertical profile display 304 using a different color (e.g., cyan) and/or another visually distinguishable characteristic relative to the other airport indicia 322, 324, 332, 334. The KAVQ airport symbology 316 and lateral trajectory 317 to the KAVQ airport on the map 302 may also be displayed or rendered using the same visually distinguishable characteristic(s) (e.g., cyan) to differentiate the KAVQ airport symbology from the other airports. In this regard, in some embodiments, the symbology associated with the other potential diversion airports may be also visually deemphasized (e.g., by fading the symbology) while the selected airport symbology is emphasized.

Figure 4:
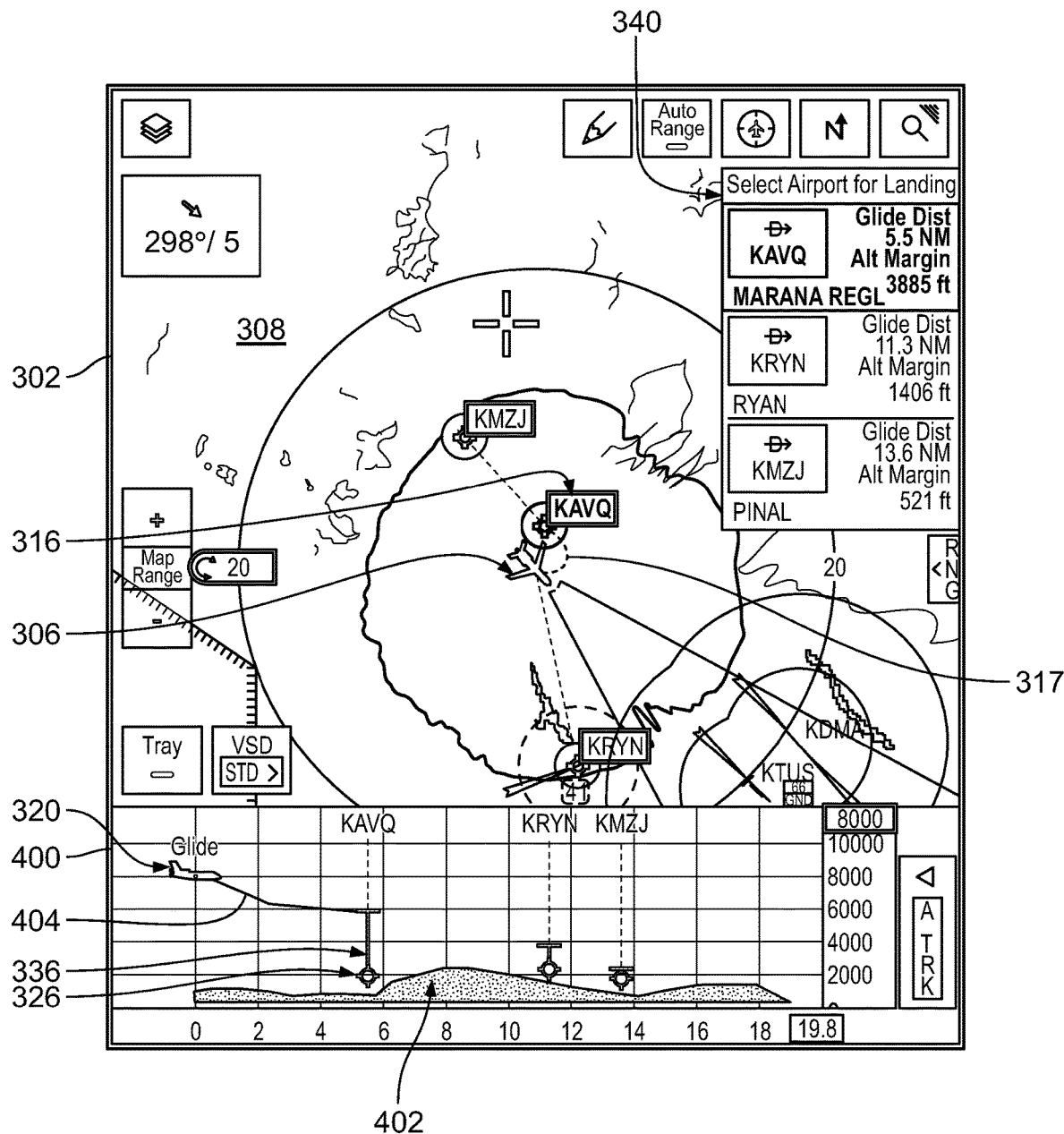

In exemplary embodiments, terrain presentation is removed from the composite vertical profile display 304 until one of the potential diversion airports is selected for analysis. In response to selection of a particular diversion airport, a graphical representation of terrain may be selectively added to the composite vertical profile display 304 to provide situational awareness of the vertical clearance (or potential lack thereof) en route to the selected airport. For example, as depicted in FIG. 4, when a pilot or other user hovers a cursor, pointer, mouse, finger, or other user input mechanism over the KAVQ airport symbology 326 on the composite vertical profile display 304, the processing system 108 and/or display system 110 dynamically generates an updated composite vertical profile display 400 that emphasizes the selected airport symbology (e.g., KAVQ airport symbology 326, 336) and includes a graphical representation 402 of the portion of the terrain 308 underlying the expected lateral trajectory 317 en route to the selected KAVQ airport, thereby allowing the pilot to assess the aircraft's vertical clearance and other concerns related to the terrain and/or obstacles underlying the lateral trajectory 317. Concurrently, the processing system 108 and/or display system 110 may graphically emphasize the KAVQ airport symbology 316 and lateral trajectory 317 on the map 302, as well as emphasize or otherwise indicate selection of the KAVQ airport within the diversion airport list 340. Thereafter, when the pilot moves the cursor or input mechanism off the KAVQ airport symbology 326 to deselect the KAVQ airport, the processing system 108 and/or display system 110 dynamically updates the composite vertical profile display 304 to remove the terrain and deemphasize the KAVQ airport symbology 326, 336 to revert the composite vertical profile display 304 back to the state preceding selection of the KAVQ airport. Likewise, the symbology 316, 317 associated with the KAVQ airport on the map 302 and within the diversion airport list 340 may revert back to a deemphasized state simultaneously in concert with the changes to the composite vertical profile display 304.

Still referring to FIG. 4, in exemplary embodiments, in response to selection of a potential diversion airport, the processing system 108 and/or display system 110 generates the updated composite vertical profile display 400 that includes a graphical representation of the gliding vertical trajectory 404 to the selected airport in lieu of the originally depicted reference gliding vertical trajectory 321. For example, when multiple airports are depicted on the composite vertical profile display, the composite vertical profile display may initially depict a generic reference gliding vertical trajectory that is independent of any particular airport or landing location and corresponds to the maximum gliding range of the aircraft based on the current aircraft altitude (e.g., assuming an optimal glide speed for the aircraft 102 that minimizes the sink rate given the current configuration or state of the aircraft 102). When an individual airport is selected for analysis, the processing system 108 and/or display system 110 displays a gliding vertical trajectory to the selected airport that reflects the maneuvering, meteorological conditions, and other factors influencing the aircraft descent rate and gliding trajectory en route to the selected airport. For example, in response to selection of the KAVQ airport, the processing system 108 and/or display system 110 displays the gliding vertical trajectory 404 corresponding to the lateral trajectory 317 en route to the KAVQ airport in lieu of the generic, airport-independent reference gliding vertical trajectory 321.

In some embodiments, when a potential diversion airport is selected within the composite vertical display 304, the composite vertical display 304 may include a selectable GUI element that allows the pilot or other user to designate the selected airport as the desired diversion destination. In response to selecting a potential diversion airport for use as a destination, the processing system 108 and/or the display system 110 may provide corresponding signals, commands, and/or instructions to the FMS 116 and/or other avionics systems 118 to facilitate operation of the aircraft 102 en route to the selected diversion airport. For example, in response to selection of the KAVQ airport for use as a diversion destination, the processing system 108 and/or the display system 110 may provide indication of the KAVQ airport and the expected lateral trajectory 317, which, in turn, may be utilized by the FMS 116 or other avionics systems 118 to determine one or more flight control commands for autonomously operating the aircraft en route to the KAVQ airport, for example, by commanding an autopilot system to operate flight control surfaces to initiate flying the lateral trajectory 317. Thereafter, a pilot may manually control or operate the aircraft 102 as desired to manage the vertical situation of the aircraft 102 to reduce the height margin or otherwise manage the energy state of the aircraft 102 while en route.

By virtue of the subject matter described herein, a pilot, co-pilot, or other crew member operating the aircraft 102 may be quickly and concurrently apprised of the anticipated vertical situation of the aircraft 102 with respect to landing at multiple different potential locations using a vertical profile display, thereby facilitating the pilot more quickly identifying and selecting a desired diversion airport in a more informed manner in the event of an engine out condition or another anomalous condition.

For the sake of brevity, conventional techniques related to aerodynamics, aircraft modeling, graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting operation of an aircraft, the method comprising:
   determining a gliding trajectory for the aircraft based at least in part on a current altitude of the aircraft and gliding characteristics of the aircraft;
   providing, on a display a vertical profile of the gliding trajectory for the aircraft emanating from a graphical representation of the aircraft at the current altitude of the aircraft on a vertical profile display on the display;
   identifying a plurality of landing locations within a range defined by the gliding trajectory from the aircraft; and
   for each landing location of the plurality of landing locations, providing, on the vertical profile display on the display, a graphical representation of a respective landing location at a respective landing location altitude associated with the respective landing location with respect to the vertical profile of the gliding trajectory at a respective distance in a forward direction of travel from the graphical representation of the aircraft corresponding to a respective geographic distance between a current location of the aircraft and the respective landing location.

2. The method of claim 1, further comprising removing a graphical representation of terrain from the vertical profile display in an absence of selection of one of the plurality of landing locations while concurrently displaying the graphical representations of the respective landing locations on the vertical profile display.

3. The method of claim 1, further comprising selectively providing a graphical representation of terrain corresponding to a lateral trajectory from the current location of the aircraft to a selected one of the plurality of landing locations.

4. The method of claim 3, further comprising determining the lateral trajectory from the current location of the aircraft based on one or more characteristics associated with the aircraft, wherein the respective geographic distance between the current location of the aircraft and the selected one of the plurality of landing locations corresponds to a geographic distance associated with the lateral trajectory.

5. The method of claim 4, wherein:
   the one or more characteristics comprise a turning radius of the aircraft; and
   the geographic distance is influenced by a current heading of the aircraft and the turning radius.

6. The method of claim 5, wherein the geographic distance is influenced by a difference between the current heading of the aircraft and a bearing aligned with the selected one of the plurality of landing locations from the current location of the aircraft.

7. The method of claim 1, wherein a bearing aligned with at least one of the respective landing locations from the current location of the aircraft is different from a current heading of the aircraft.

8. The method of claim 7, wherein the at least one of the respective landing locations is behind the aircraft.

9. The method of claim 1, further comprising providing, on the display, a graphical indication of a respective vertical height margin associated with the respective landing location.

10. The method of claim 9, wherein the respective vertical height margin associated with the respective landing location corresponds to a difference between an altitude of the gliding trajectory and the respective landing location altitude associated with the respective landing location at the respective distance in the forward direction of travel from the graphical representation of the aircraft.

11. The method of claim 1, wherein a vertical dimension between the vertical profile of the gliding trajectory and the respective graphical representations of the respective landing locations conveys a relative altitude difference between the respective landing location altitudes associated with the respective landing locations and respective estimated aircraft altitudes likely to result from gliding along the respective geographic distances en route to the respective landing locations.

12. The method of claim 1, wherein the graphical representations of the respective landing locations are depicted in the forward direction of travel from the graphical representation of the aircraft independent of a current heading of the aircraft.

13. A non-transitory computer-readable medium having computer-executable instructions stored thereon that, when executed by a processing system, cause the processing system to:
   determine a gliding trajectory for an aircraft based at least in part on a current altitude of the aircraft and gliding characteristics of the aircraft;
   provide instructions to cause a graphical representation of a vertical profile of the gliding trajectory for the aircraft emanating from a graphical representation of the aircraft at the current altitude of the aircraft on a vertical profile display to be displayed on a display;
   identify a plurality of landing locations within a range defined by the gliding trajectory from the aircraft; and
   for each respective landing location of the plurality of landing locations, provide instructions to cause a graphical representation of the respective landing location to be displayed on the vertical profile display on the display at a respective landing location altitude associated with the respective landing location with respect to the gliding trajectory at a respective distance in a forward direction of travel from the graphical representation of the aircraft corresponding to a respective geographic distance associated with a predicted lateral trajectory for gliding from a current location of the aircraft to the respective landing location.

14. The computer-readable medium of claim 13, wherein the computer-executable instructions cause the processing system to provide instructions to cause a graphical representation of terrain to be selectively displayed on the vertical profile display on the display in response to user selection of one of the plurality of landing locations.

15. The computer-readable medium of claim 14, wherein the graphical representation of terrain corresponds to the predicted lateral trajectory from the current location of the aircraft to the selected one of the plurality of landing locations.

16. The computer-readable medium of claim 15, wherein the computer-executable instructions cause the processing system to determine the predicted lateral trajectory from the current location of the aircraft based on one or more characteristics associated with the aircraft, wherein the respective geographic distance between the current location of the aircraft and the selected one of the respective landing locations corresponds to a geographic distance associated with the predicted lateral trajectory.

17. The computer-readable medium of claim 16, wherein the computer-executable instructions cause the processing system to:
   obtain the current location of the aircraft and a current heading of the aircraft from a navigation system onboard the aircraft; and determine the predicted lateral trajectory from the current location of the aircraft based on the current heading of the aircraft and the one or more characteristics associated with the aircraft.

18. A flight deck display for an aircraft, the flight deck display having rendered thereon a vertical profile display comprising:
a graphical representation of the aircraft at a vertical position corresponding to a current altitude of the aircraft;
a graphical representation of a gliding trajectory for the aircraft emanating from the graphical representation of the aircraft at the current altitude of the aircraft; and
a plurality of graphical representations corresponding to a plurality of airports, the plurality of graphical representations being displayed on the vertical profile display concurrently, wherein for each airport of the plurality of airports:
the respective graphical representation of the respective airport is positioned ahead of the graphical representation of the aircraft at a respective distance with respect to the graphical representation of the aircraft in a forward direction of travel from the graphical representation of the aircraft corresponding to a respective geographic distance between a current location of the aircraft and the respective airport; and
the respective graphical representation of the respective airport is vertically positioned on the vertical profile display according to a respective airport altitude associated with the respective airport.

19. The flight deck display of claim 18, wherein the vertical profile display further comprises for each airport of the plurality of airports, a graphical indication of an estimated vertical height margin between the graphical representation of the gliding trajectory and the respective graphical representation of the respective airport.

20. The flight deck display of claim 18, wherein:
the respective geographic distance between the current location of the aircraft and the respective airport corresponds to a respective lateral trajectory from the current location of the aircraft to the respective airport; and
the vertical profile display further comprises a graphical representation of terrain corresponding to the respective lateral trajectory from the current location of the aircraft to a selected one of the plurality of airports.

* * * * *